(12) United States Patent
Usuki et al.

(10) Patent No.: US 8,250,622 B2
(45) Date of Patent: Aug. 21, 2012

(54) METHOD AND APPARATUS FOR BROADCASTING TO A PORTABLE TERMINAL

(75) Inventors: Izumi Usuki, Katano (JP); Sadashi Kageyama, Sanda (JP); Akira Kisoda, Moriguchi (JP); Hidekuni Yomo, Kamakura (JP)

(73) Assignee: Panasonic Corporation, Osaka (JP)

( * ) Notice: Subject to any disclaimer, the term of this patent is extended or adjusted under 35 U.S.C. 154(b) by 829 days.

(21) Appl. No.: 10/560,312

(22) PCT Filed: Oct. 26, 2004

(86) PCT No.: PCT/JP2004/015810
§ 371 (c)(1),
(2), (4) Date: Dec. 9, 2005

(87) PCT Pub. No.: WO2005/043783
PCT Pub. Date: May 12, 2005

(65) Prior Publication Data
US 2006/0120378 A1 Jun. 8, 2006

(30) Foreign Application Priority Data

Oct. 30, 2003 (JP) .................................. 2003-370550
Dec. 11, 2003 (JP) .................................. 2003-413639

(51) Int. Cl.
*H04N 7/16* (2006.01)
*H04J 3/02* (2006.01)
(52) U.S. Cl. .......................... 725/146; 725/151; 370/537
(58) Field of Classification Search .................... 725/146
See application file for complete search history.

(56) References Cited

U.S. PATENT DOCUMENTS

| 6,157,815 | A | 12/2000 | Collins et al. |
| 6,674,477 | B1 | 1/2004 | Yamaguchi et al. |
| 6,724,741 | B1* | 4/2004 | Nieczyporowicz et al. .. 370/335 |
| 2001/0005374 | A1* | 6/2001 | Kumazaki et al. ............. 370/428 |
| 2002/0051462 | A1* | 5/2002 | Ertel et al. ..................... 370/442 |
| 2003/0166392 | A1 | 9/2003 | Laiho et al. |
| 2003/0196211 | A1 | 10/2003 | Chan |
| 2003/0200328 | A1 | 10/2003 | Kallio et al. |
| 2004/0244037 | A1 | 12/2004 | Yamaguchi et al. |
| 2005/0090235 | A1* | 4/2005 | Vermola et al. ............ 455/414.3 |

FOREIGN PATENT DOCUMENTS

| EP | 0905976 | 3/1999 |
| EP | 1032147 | 8/2000 |
| EP | 1071221 | 1/2001 |

(Continued)

OTHER PUBLICATIONS

English Language Abstract of JP 2002-010225.
English Language Abstract of JP 2003-324711.
English Language Abstract of JP 2003-115808.
English Language Abstract of JP 11-225168.
English Language Abstract of JP 10-507045.

(Continued)

*Primary Examiner* — Bennett Ingvoldstad
(74) *Attorney, Agent, or Firm* — Greenblum & Bernstein, P.L.C.

(57) ABSTRACT

Time slice transmission methods transmit data in bursts, thus creating a delay until playback of a service can begin when changing the service and therefore preventing smooth zapping. To solve this problem, a first stream used for burst transmission of packet sets and a second stream for continuously transmitting packets at a speed determined according to the transmission rate required for a particular service are multiplexed and transmitted. The content is reproduced using the continuously transmitted second stream during zapping, and the first stream transmitted in bursts is reproduced after zapping ends.

8 Claims, 15 Drawing Sheets

FOREIGN PATENT DOCUMENTS

| | | |
|---|---|---|
| EP | 1337071 | 8/2003 |
| JE | 2001-69023 | 3/2001 |
| JP | 7-250314 | 9/1995 |
| JP | 10-507045 | 7/1998 |
| JP | 11-225168 | 8/1999 |
| JP | 2000-244425 | 9/2000 |
| JP | 2001-268027 | 9/2001 |
| JP | 2002-010225 | 1/2002 |
| JP | 2003-115808 | 4/2003 |
| JP | 2003-324711 | 11/2003 |
| WO | 96/10895 | 4/1996 |
| WO | 03-073753 | 9/2003 |
| WO | 03/073753 | 9/2003 |
| WO | 03/075494 | 9/2003 |
| WO | WO-03/073753 A1 * | 9/2003 |
| WO | 03/088646 | 10/2003 |

OTHER PUBLICATIONS

Hasuta et al., "Digital Television wa Sekai no Ketai ni Utsurunoka Dai 3 by <Gijutsu no Henka> Keitai. Ido Jushin o Shiya ni Denso Gijutsu o Kodoka," Nikkei Electronics, No. 866, Nikkei Business Publications, Inc., (Feb. 2, 2004), pp. 108-113.

A partial English language translation of Hasuta et al., "Digital Television wa Sekai no Ketai ni Utsurunoka Dai 3 by <Gijutsu no Henka> Keitai Ido Jushin a Shiya ni Denso Gijutsu o Kodoka," Nikkei Electronics, No. 866, Nikkei Business Publications, Inc., (Feb. 2, 2004), pp. 108-113.

English language Abstract of JP 2001-69023, Mar. 16, 2001.
English language Abstract of JP 2000-244425, Sep. 8, 2000.
English language Abstract of JP 2001-268027, Sep. 28, 2001.
English language Abstract of JP 7-250314, Sep. 26, 1995.

* cited by examiner

METHOD AND APPARATUS FOR BROADCASTING TO A PORTABLE TERMINAL

TECHNICAL FIELD

The present invention relates to digitally broadcasting to a portable terminal, and relates more specifically to a transmission method and apparatus for broadcasting digital data to a portable terminal.

PRIOR ART

The broadcasting method used for terrestrial digital broadcasting in Europe is standardized by the ETSI (see DVB-T EN 300 477). This standard does not, however, support partial reception of broadcast segments as supported by the domestic Japanese standard (ARIB STD-B31, for example). In order for a portable terminal to receive a DVB-T broadcast, the terminal must therefore receive the entire signal in the same way as a set-top box or other stationary terminal, thus consuming much power. This creates problems for practical application, such as a shortened continuous playback time, because a portable terminal has a limited power supply capacity.

EP1337071A2 therefore teaches, as shown in FIG. 11, a method of compiling packets for one service into packet sets, transmitting the packet sets at high speed in a short period of time as data bursts 10, and broadcasting packet sets for each service in sequence so that packet sets do not become mixed with packet sets for a different service during the transmission of a single packet service.

Power consumption by the receiver is reduced by supplying power to the reception unit only while packet sets for the desired service are being transmitted. (This is referred to as the "time slice" method below.)

A problem with the time slice method is that content playback does not start for the number of seconds until the packet sets for the desired service are transmitted when the receiver is tuning to a particular channel after the power is turned on and when the channel is switched to a different service.

[Patent reference 1] EP1337071A2

DESCRIPTION OF THE INVENTION

Problem to be Solved by the Invention

A problem with time slice broadcasting as described above is that there is a delay until the selected service can be reproduced when the channel is changed because data is transmitted in bursts, and smooth zapping is therefore not possible.

The present invention is directed to solving this problem of the prior art, and an object of the invention is to shorten the delay time until when playback starts by selectively receiving time slices containing content and zapping data during channel surfing.

Means for Solving the Problem

The present invention provides a transmission method that is a transmission method in a broadcasting system having a step of generating a first stream (intermittent data portion) for burst transmission of a packet set containing unitary content for each service; and a step of generating a second stream (continuous data portion) for transmitting packets at a speed conforming to the transmission rate required for the service; wherein the second stream carries information relating to the content transmitted in the first stream. Burst transmission as used herein refers to transmitting content in batches in a short period of time and then pausing transmission for a time.

In another aspect of the present invention the first stream sequentially transmits intermittent data for a plurality of services; and the second stream transmits content equivalent to the content transmitted by all or part of the services transmitted in the intermittent portion of the first stream.

In another aspect of the present invention the first stream transmits high quality data, and the second stream transmits the same content as the first stream compressed at a high compression rate to a smaller amount of data.

The second stream in the present invention is data related to the content of the first stream, and the data payload of the second stream is smaller than the data payload of the first stream. The second stream is, for example, a stream generated using a higher data compression rate than is used to generate the first stream.

In another aspect of the present invention the first stream is data containing high quality audio and video data, and the second stream contains at least one of still image data and audio data relating to the first stream.

In another aspect of the present invention at least one of the first stream and second stream has a data field denoting the relationship between content transmitted in the second stream and first stream.

In another aspect of the present invention a data field denoting the relationship between content transmitted in the second stream and first stream is contained in a third stream.

In another aspect of the present invention a data field denoting the relationship between content transmitted in the second stream and first stream is contained in the PMT of the PSI.

In another aspect of the present invention a time information field denoting the time from transmission of one packet set to transmission of the next packet set is contained in the second stream.

A further aspect of the present invention is a content transmission method that is a transmission method for burst transmitting packet sets composed of unitary content for each service, the content transmission method having a step of generating packet sets of a first format from unitary content for each service, a step of generating packet sets of a second format containing content equivalent or related to all or part of the services transmitted in the packet sets of the first format, and a step of sequentially transmitting packet sets of the first format and packet sets of the second format in a first stream.

In another aspect of the present invention the first-format packet sets transmit high quality data, and the second-format packet sets transmit the same content as the first-format packet sets compressed at a high compression rate to a smaller amount of data.

In another aspect of the present invention the first-format packet sets contain data including high quality audio data and video data, and the second-format packet sets contain at least one of still image data and audio data related to the first-format packet sets.

In another aspect of the present invention at least one of the first-format packet sets and second-format packet sets have a data field denoting the relationship between content transmitted in the second-format packet sets and first-format packet sets.

In another aspect of the present invention a data field denoting the relationship between content transmitted in the second-format packet sets and first-format packet sets is contained in a separate second stream.

In another aspect of the present invention a data field denoting the relationship between content transmitted in the second-format packet sets and first-format packet sets is contained in the PMT of the PSI.

In another aspect of the present invention the content transmitted in the second-format packet sets and first-format packet sets have a mutually synchronized time stamp.

In another aspect of the present invention the content transmitted in the second-format packet sets and first-format packet sets transmit information denoting a time stamp difference.

The present invention uses time division signal multiplexing to transmit a first stream for burst transmitting packet sets in batches in a short time at a sufficiently high data transmission rate and a second stream for transmitting packets at a speed corresponding to the transmission rate needed for the service. The second stream transmits low quality data of the same content as the first stream, for example. During zapping, the constantly transmitted second stream is received and the content reproduced. When zapping has ended, the burst-transmitted first stream is received and reproduced.

A further aspect of the present invention is a transmission apparatus for a broadcasting system, the transmission apparatus having a first stream (intermittent data portion) generating means for burst transmission of a packet set containing unitary content for each service; and a second stream (continuous data portion) generating means for transmitting packets at a speed conforming to the transmission rate required for the service; wherein the second stream carries information relating to the content transmitted in the first stream.

A further aspect of the present invention is a content transmission apparatus that is a transmission method for burst transmitting packet sets composed of unitary content for each service, the content transmission apparatus having a means of generating packet sets of a first format from unitary content for each service, a means of generating packet sets of a second format containing content equivalent or related to all or part of the services transmitted in the packet sets of the first format, and a means of sequentially transmitting packet sets of the first format and packet sets of the second format in a first stream.

By thus combining burst transmission with constant signal transmission, the present invention reduces power consumption by intermittently receiving the first stream during normal viewing times, and also enables immediately viewing other content by reproducing the second stream during tuning and zapping or channel surfing.

The present invention also provides a transmitter for transmitting to a receiver using the foregoing transmission system or content transmission system, a transmission method related to the foregoing transmission system or content transmission system, a program for achieving the same, an a recording medium for storing the same.

The present invention is described below with reference to the following preferred embodiments and accompanying figures, but these are used by way of example only and the present invention shall not be limited thereto.

Effect of the Invention

The present invention multiplexes and transmits high quality burst data and low quality continuous data, reproduces the constantly receivable continuous data during zapping or channel surfing, and thereby can shorten the wait time when tuning. Time stamp synchronization or correction can also reduce the effect of mode changes by the receiver during playback.

| Key to the figures | |
|---|---|
| 1 | head end |
| 2-6 | content source for services S1 to S5 |
| 7, 7b | IP packet |
| 8 | first processor |
| 9 | second processor |
| 10 | burst data |
| 11 | transport stream multiplexed with low image quality data |
| 11s1 to 11s5 | low image quality data package |
| 12 | multiplexer |
| 13 | transmitter |
| 14 | transmission channel |
| 15 | zapping burst |
| 16 | time stamp offset detector |
| 17 | time stamp correction processor |

BEST MODE FOR ACHIEVING THE INVENTION

Preferred embodiments of the present invention are described below using by way of example a content transmission method in which intermittent and continuous streams are mixed for transmission.

Intermittent transmission is a method of compressing a signal containing video signals and/or audio signals in a specified presentation period Tin (of 5 seconds, for example) for high quality reproduction, and then transmitting the compressed signals during a time equal to 1/N (where N is a positive integer such as N=36) of Tin. This enables time-division transmission of a maximum 36 different services (such as services for 36 television channels) during presentation period Tin, and sends a new video signal every presentation period Tin. A program broadcast over a particular channel or from a particular provider is referred to herein as a "service." This is referred to as intermittent transmission because the video signal for a particular service (such as the program broadcast on one channel) is intermittently transmitted every presentation period Tin.

Continuous transmission is a method of transmitting a signal compressed for low quality reproduction during a period Tcon (approximately 23 ms) that is shorter than one frame (approximately 1/30 sec, for example).

This invention relates to a method of transmitting a stream containing both intermittently transmitted packets and continuously transmitted packets.

Intermittent transmission enables viewing high quality video but requires a delay of approximately 5 seconds every time the service is changed. Intermittent transmission alone is thus not suited to "zapping" or "channel surfing," an operation whereby the viewer rapidly changes the service to find a desired service for viewing.

Continuous transmission alone, on the other hand, imposes no delay when the service is changed and thus enables the viewer to quickly see the video on the selected service.

By mixing intermittent transmission and continuous transmission, the present invention enables viewing the selected video or other service without delay even while zapping, and enables viewing the selected service with high quality when a desired service is found.

Note that the process of the invention described below can be achieved entirely in software.

(Embodiment 1)

Embodiments of a transmission method according to the present invention are described below with reference to the accompanying figures with application to zapping used by way of example.

Figure 1:
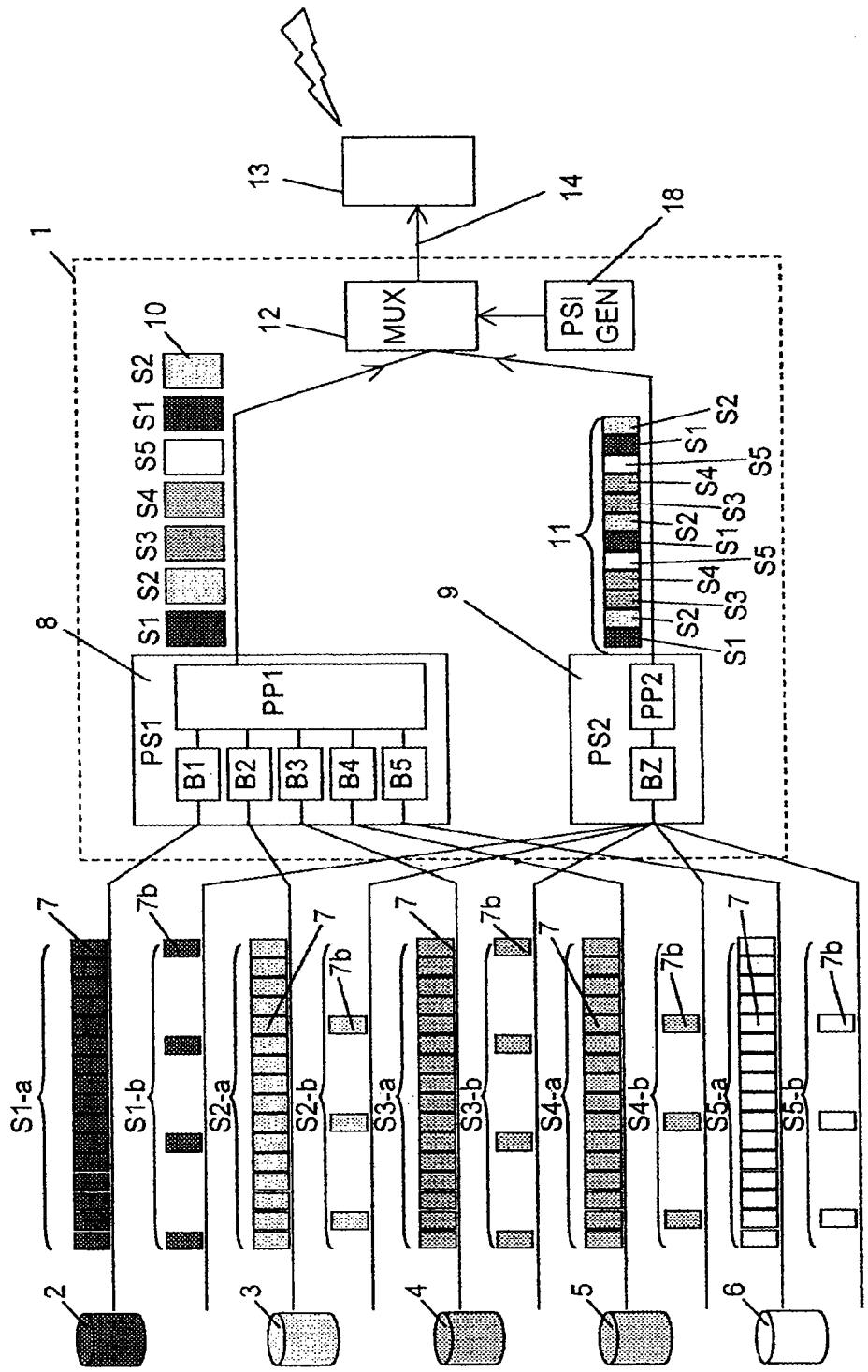
FIG. 1 describes the transmission method in a first embodiment of the present invention.

FIG. 1 describes generating a transmission signal in the present invention.

Reference numeral 1 is a digital broadcasting head end, and 2, 3, 4, 5, 6 are the content sources for services S1, S2, S3, S4, S5. The content of each service is encoded in both high quality and low quality, resulting in high quality IP (Internet Protocol) package 7, and low quality IP packet 7b. Each content source has a high quality encoder for generating IP packets 7, and a low quality encoder for generating IP packets 7b, each encoder being a discrete real-time encoder. The high quality encoder has an internal clock CLa indicating real time, and the low quality encoder has an internal clock CLb indicating real time. That the time kept by internal clock CLa and the time kept by internal clock CLb match will be obvious.

The same IP address is assigned to each IP packet 7 from the same content source, such as content source 2. If the content source is different, that is, if the service is different, the IP address is also different. The same IP address can also be used for both the high quality IP packets 7 and the low quality IP packets 7b, or different IP addresses can be used.

The high quality encoder is an MPEG-4 encoder that can encode content containing a video signal and/or audio signal at an average transfer rate of 350 kbps.

If the bandwidth of the broadcast signal is approximately 15 Mbps and (350+64=) 414 kbps is required for one service, then (15000÷414=) approximately 36 individual services can be carried. The use of MPEG-4 and the foregoing transfer rate are used by way of example only, and other transfer rates and compression methods can obviously be used.

The transfer rate and other parameters shall not be limited to the foregoing. Windows Media, QuickTime, JPEG-2000, or other compression method could also alternatively be used.

Figure 14:
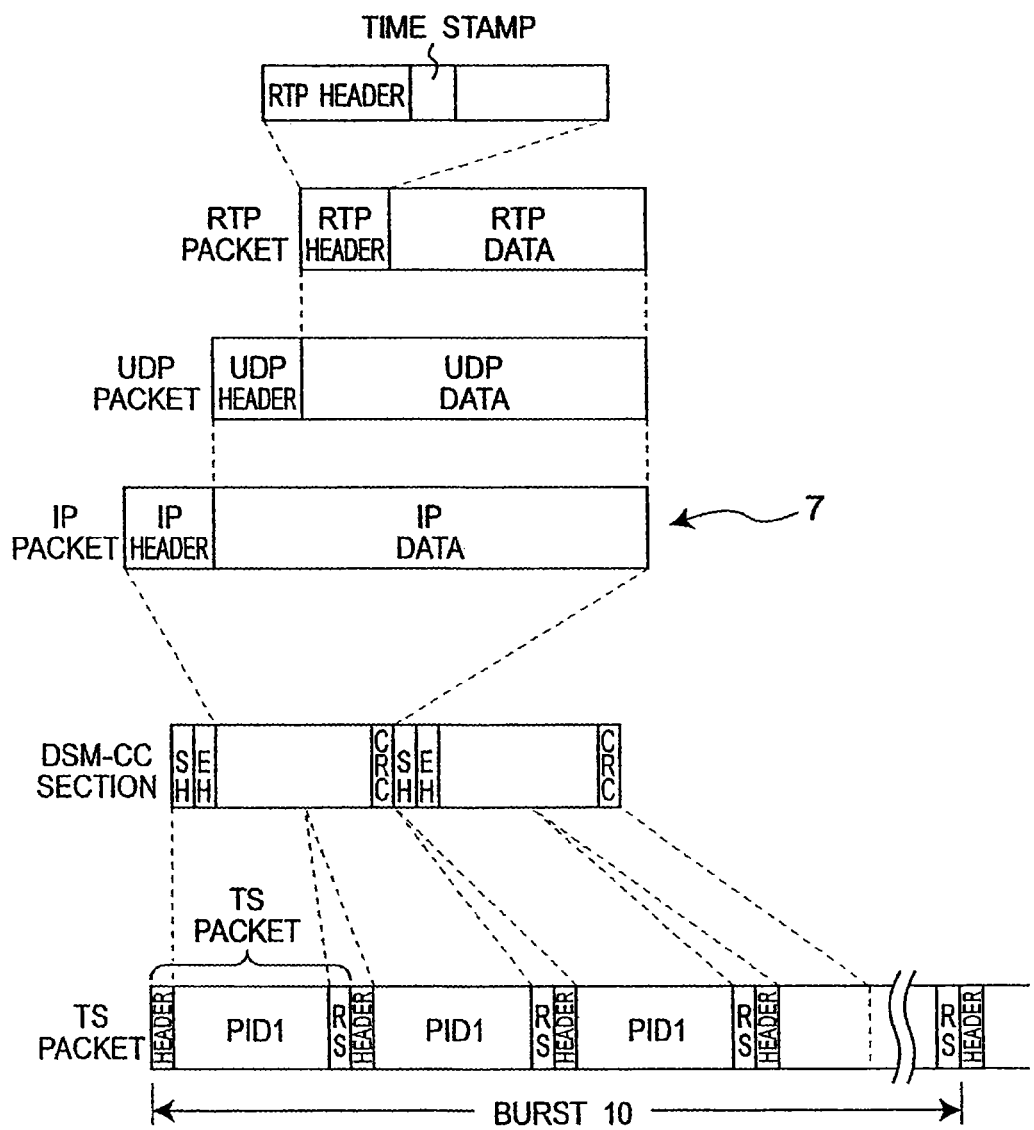
FIG. 14 describes conversion from an IP packet to a TS packet.

The high quality data is described first below using FIG. 14. Video and audio data compressed using MPEG-4 to an average transfer rate of 350 Kbps is generated as RTP (real-time transport protocol) data, and an RTP header is thus added. A time stamp Ta is added to the RTP header for synchronization during sending and receiving. The RTP data and RTP header are stored in an RTP packet. The RTP packets are generated as UDP (user datagram protocol) data to which a UDP header is added. The UDP data and UDP header are stored in an UDP packet. The UDP packets are generated as IP data to which an IP header is added, and the IP data and IP header are stored in an IP packet 7.

The resulting high quality encoded IP packets 7 are input to the processor 8 shown in FIG. 1. The processor 8 has a number of buffers equal to the number of content sources. In the example shown in FIG. 1 there are five buffers B1, B2, B3, B4, B5, and each buffer can store the number of IP packets 7 (163 IP packets in this example) equivalent to a specific presentation period Tin (5 seconds in this example). Because the IP packets are MPEG compressed, the actual storage time is approximately 5/36 second and not 5 seconds.

If IP packets 7 for service S1 equivalent to presentation period Tin are accumulated from buffer B1, the accumulated IP packets are sequentially sent to processing unit PP1. As shown in FIG. 14, the processing unit PP1 converts the IP packets 7 to DSM-CC (digital storage media command control) sections, and then to TS (transport stream) packets. The TS packets have a fixed length (such as 188 bytes). Each TS packet starts with a TS header. Each TS header contains a packet ID, or PID, identifying the type of TS packet. The PID for TS packets carrying service S1 content, for example, is PID1.

Note that same PID is assigned to TS packets carrying data for the same service, and the PID for TS packets carrying service S2 content is thus PID2, the PID for TS packets carrying service S3 content is PID3, and so forth. A standard method such as ISO/IEC 13818-1, ISO/IEC 13818-6, or ETSI/DVB EN301192, for example, is used for conversion from IP packets to TS packets.

The multiple TS packets identified by PID1 are then sequentially output. The group of TS packets thus output for an approximately 5 second presentation period are referred to as burst 10. Block S1 output from processor 8 in FIG. 1 denotes a burst and contains continuous TS packets for an approximately 5 second presentation of service S1.

If IP packets 7 for service S2 equivalent to presentation period Tin are accumulated from buffer B2, the accumulated IP packets are sequentially sent to processing unit PP1, converted thereby from IP packets to TS packets, and PID2 is assigned as the packet ID to each of the resulting TS packets. The multiple TS packets identified by PID2 are then sequentially output. Block S2 output from the processor 8 denotes a burst, and contains continuous TS packets for an approximately 5 second presentation of service S2.

TS packets for different services are thus output in bursts and sent to the multiplexer 12.

Low quality data is described next. Video data and audio data MPEG-4 compressed to an average transfer rate of 64 kbps is converted to IP packets 7b using the same procedure used to generate the high quality data as shown in FIG. 14. RTP packets are thus also contained in the IP packets 7b, and the IP packets 7b thus also contain a time stamp Tb for synchronization during sending and receiving.

The low quality encoded IP packets 7b are input to the processor 9 shown in FIG. 1. The processor 9 has one buffer Bz and stores IP packets 7b from all content sources in the sequence received. If all or part of the IP packets 7b from different content sources overlap the processor 9 could have a plurality of buffers similarly to the processor 8. The buffer capacity must only be sufficient to store one IP packet 7b. The IP packets 7b are sent to processing unit PP2, which converts the IP packets 7b to TS packets in the same way as processing unit PP1. The same PID, such as PIDX, is assigned to all converted TS packets regardless of the service. PIDX is a unique PID that denotes a zapping TS packet. The TS packets from the processor 9 are sent to the multiplexer 12. A PSI generator 18 is connected to the multiplexer 12.

The same PID, such as PIDX, is assigned regardless of the service to all TS packets carrying low quality data in this example, but a PID that differs according to the service could be assigned in the same way as for transmitting high quality data without adversely affecting the effect of the present invention.

The format of the low quality data shall not be limited to containing both video and audio data, and could contain only one or any combination of video, still image, audio, and text data.

The format of the low quality data could also be dynamically determined according to such conditions as the number of bursts for simultaneous services and the average transfer rate.

The PSI generator 18 generates program specific information (PSI). PSI contains a PAT (a program association table), a PMT (program map table), a CAT (conditional access table), and a NIT (network information table). Each table is stored segmented in one or multiple TS packets. The conditional access function has no relationship to the present invention and further description of the CAT is therefore omitted below. The data structure of these tables is described below. The multiplexer 12 is described first.

Figure 15:
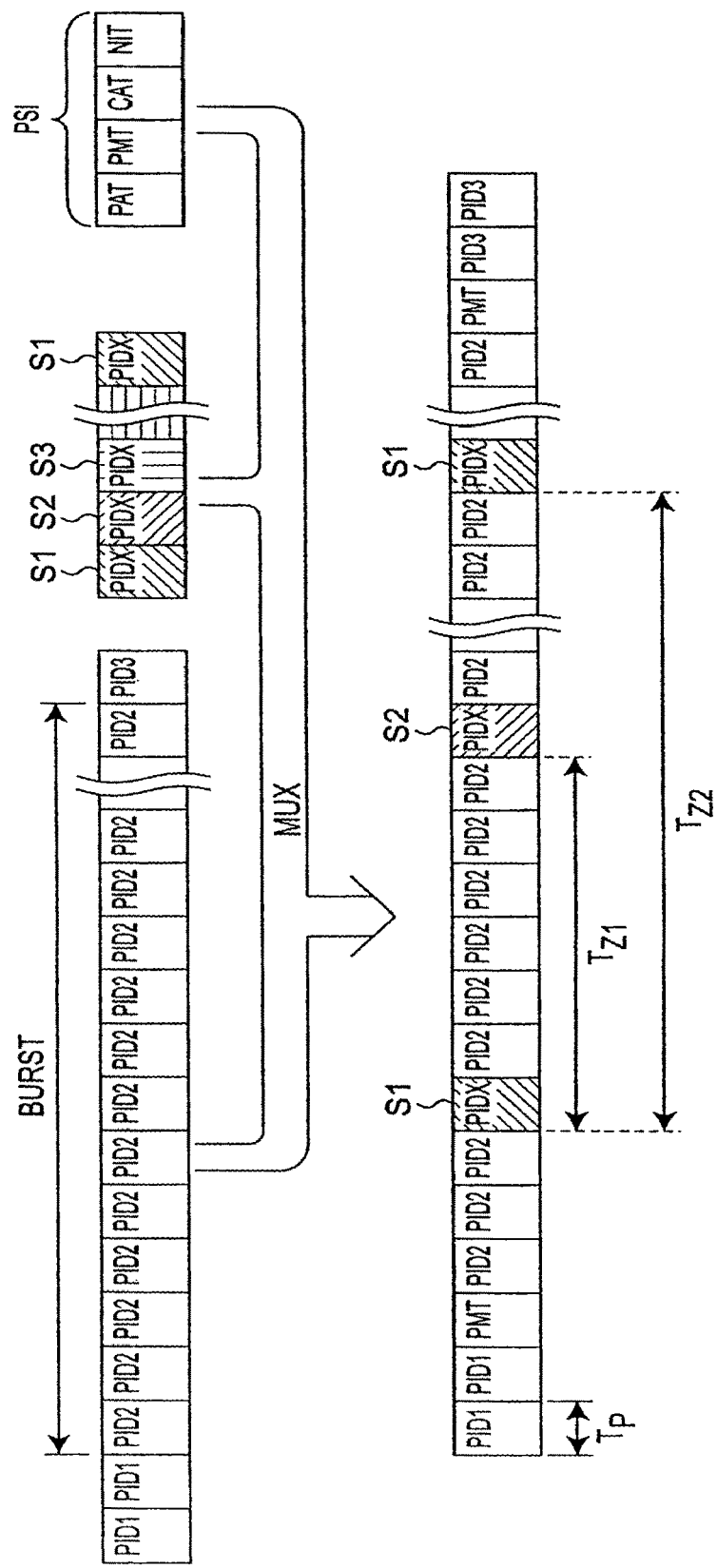
FIG. 15 describes multiplexing by a multiplexer.

As shown in FIG. 15 the multiplexer 12 receives three types of input, that is, high quality TS packets from the processor 8, low quality TS packets from the processor 9, and PSI TS packets from the PSI generator 18, and combines these into a single stream. Note that only one PAT and NIT are set for all services, but a different PMT is defined for each service. Where the PAT, PMT, and NIT are inserted is defined by the particular coding standard used. The low quality TS packets are dispersedly inserted, but the time difference Tz1 between one low quality TS packet S1 and the next low quality TS packet S2 is approximately 0.65 msec. In addition, the time difference Tz2 between one low quality TS packet S1 and the next low quality TS packet S1 in the same service is approximately 23.5 msec. Note, further, that these time differences Tz1 and Tz2 will change if the transfer rate changes. The multiplexed stream is passed as transmission channel 14 to the transmitter 13 and output to the transmission path by the transmitter 13.

The data structure is described next.

The packet ID (PID) contained in the TS packet header is defined as follows.

High quality TS packet: a different PID is defined for each service (a code denoting high quality may also be included)
Low quality TS packet: the same PID is used for all services (a code denoting low quality may also be included)
PAT TS packet: 0X0000
PMT TS packet: a different PID is defined for each service (a code denoting a PMT may also be included)
NIT TS packet: 0X0010

The value of the program number defined for each service is paired with the PID of the PMT defined for each service in the PAT. This data is written to the program_number area and the program map_PID area in the PAT. If there are five services S1, S2, S3, S4, S5, for example, there are five PMTs. If the PIDs for these five PMTs are PMT-PID1, PMT-PID2, PMT-PID3, PMT-PID4, PMT-PID5, the PAT stores a correlation table such as shown in Table 1.

TABLE 1

| Service | PID of related PMT |
|---------|--------------------|
| S1      | PID1 of the PMT    |
| S2      | PID2 of the PMT    |
| S3      | PID3 of the PMT    |
| S4      | PID4 of the PMT    |
| S5      | PID5 of the PMT    |

The PID of the high quality TS packets for the service corresponding to the PMT are stored in the PMT. This data is written to the elementary_PID area of the PMT.

Therefore, if the service is identified, the PID for the PMT corresponding to that service can be read from Table 1, the PMT can be identified from the PID of the PMT, and once the PMT is determined, the high quality TS packets can be determined.

The PMT also contains a descriptor. The descriptor is the value of the program number set for each service paired with the IP address of the IP packets carrying the service. For example, the IP address of service S1 is assigned to the PMT identified by PMT-PID1, and the IP address for service S2 is assigned to the PMT identified by PMT-PID2. A correspondence table linking services and IP addresses can thus be acquired from the five PMT.

Note that the descriptor could be included in the NIT.

In addition, the foregoing information could be stored using service information SI instead of a PSI.

The PSI generator 18 can be disposed to the processor 8 so that the PSI is contained in the high quality TS packet stream, or disposed to the processor 9 so that the PSI is contained in the low quality TS packet stream.

Figure 2:
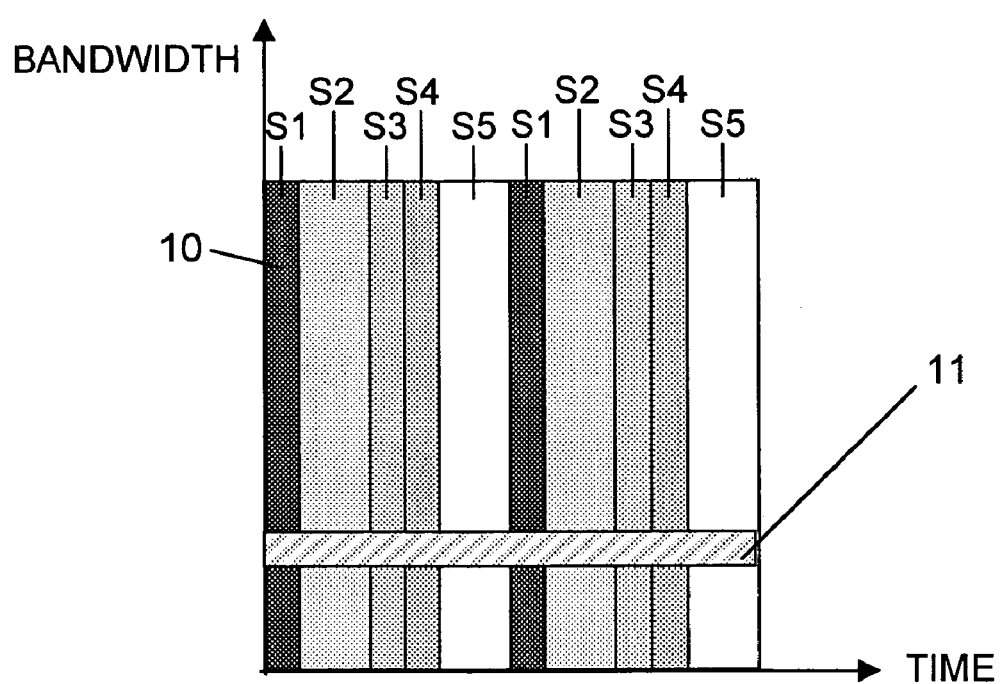
FIG. 2 illustrates data allocation on the transmission channel 14 in a first embodiment of the present invention.

FIG. 2 shows the data allocation on the transmission channel 14. In practice SI or PSI is also transmitted but these not shown in the figure because the SI and PSI are the same as those used in standard digital broadcasting.

Figure 3:
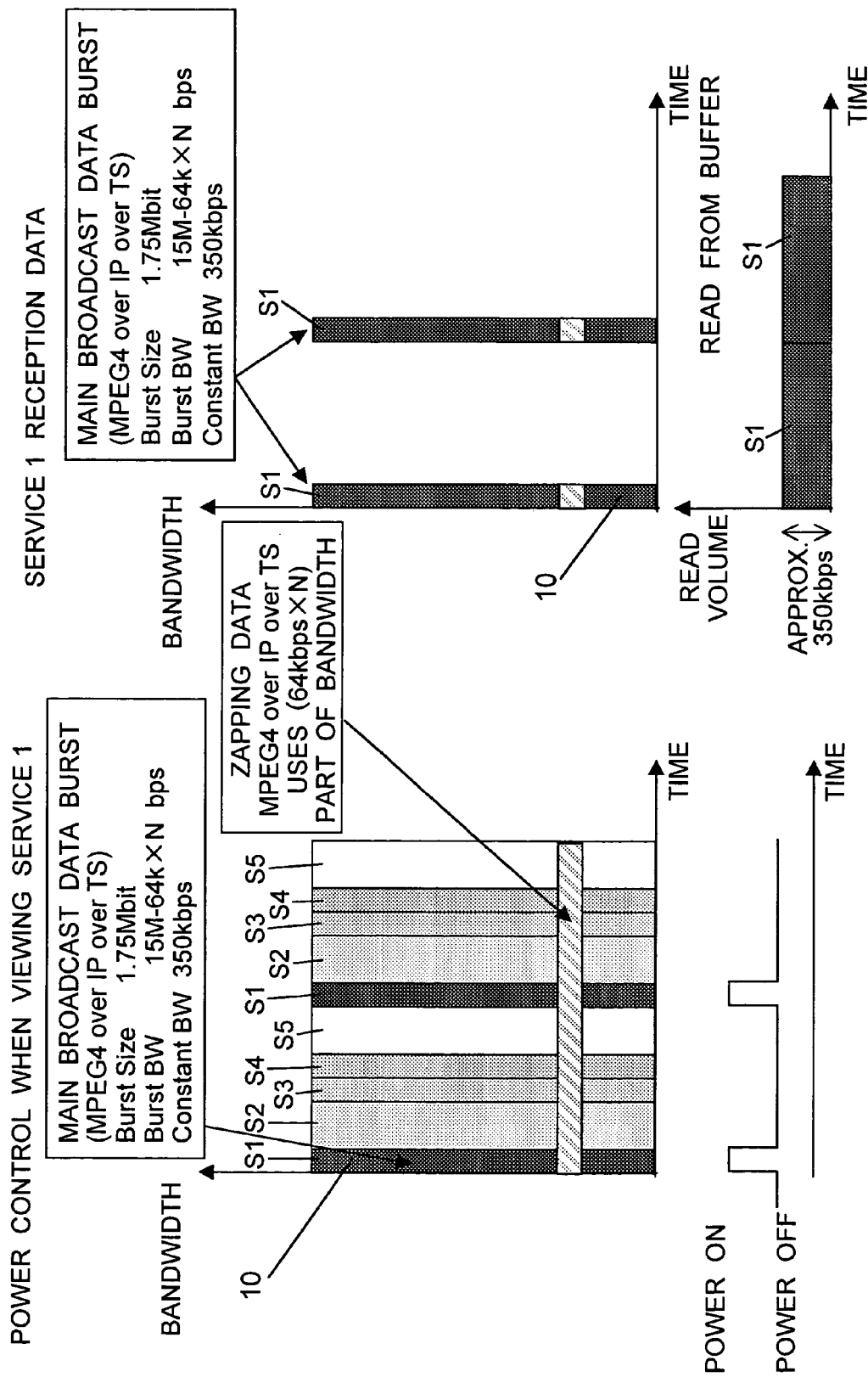
FIG. 3 describes power supply control in a first embodiment of the present invention.

The reception method used to receive these foregoing signals is described next below with reference to the figures. FIG. 3 shows power supply control in the transmission method of the present invention when receiving high quality data for service S1.

High quality data for service S1 is broadcast in bursts as shown in FIG. 3. Because approximately 250 ms is required from when burst reception starts until packet output begins, the receiver starts supplying power to the demodulation unit approximately 250 ms before burst reception beings, and accumulates the reception data for service S1 transmitted in bursts to an internal buffer. Power supply to the demodulation unit stops after burst transmission ends, but power supply to the playback unit continues as the playback unit reads data from the buffer and reproduces the content at the rate required for presentation. Power consumption can thus be suppressed. (This mode of receiving intermittent data is referred to below as the intermittent reception mode.)

Figure 4:
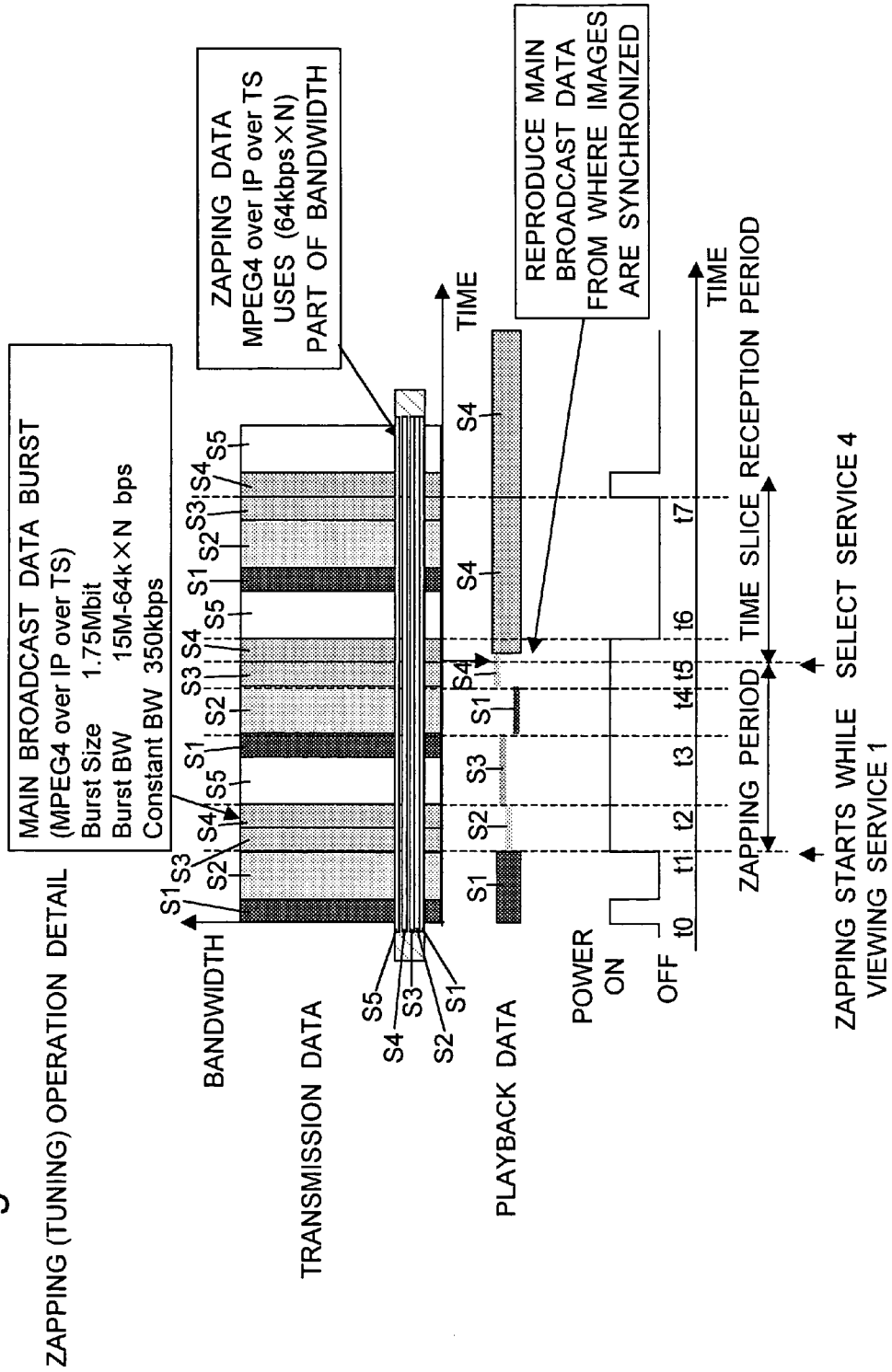
FIG. 4 describes a reception method for zapping reception of a stream in a first embodiment of the present invention.

The reception method used while zapping is described next. FIG. 4 describes the reception method used during zapping reception in the present invention.

If service S1 is being received in the intermittent reception mode at time t0 and the user then operates a service selection button or other user interface control at time t1 to change the service, the power supply to the reception unit turns on and the zapping mode is activated. Using the service-PID correlation table and the service-IP address correlation table acquired from the SI or PSI, the receiver extracts the low quality data for service S2 from the low quality TS packet stream (also called the zapping stream), and begins playback. The receiver simultaneously waits to receive the high quality data bursts for service S2.

If the user then selects service S3 at time t2, the receiver extracts the low quality data for service S3 from the zapping stream, starts playback, and simultaneously waits to receive the service S3 high quality data burst. If the user then tunes into service S1 at time t3, the receiver extracts the service S1 low quality data from the zapping stream, starts playback, and simultaneously waits to receive the service S1 high quality data burst.

Because the beginning of a burst for the tuned service is not detected in the burst data with the operation to this point, the receiver remains in the zapping mode.

If the user then selects service S4 at time t4, the receiver extracts the low quality data for service S4 from the zapping stream, starts playback, and waits to receive the high quality data burst for service S4. When the service S4 burst is transmitted at time t5, service S4 burst reception starts immediately, high quality data playback begins, control switches to the burst reception mode, and power supply to the reception unit stops from time t6 to time t7 when the next service S4 burst is transmitted.

The service-PID correlation table for the services and PIDs carrying high quality data is carried in the SI or PSI in this embodiment of the invention, but the method of transmitting the correlation table shall not be so limited. More particularly, the correlation table can be transmitted in the burst 10 or transport stream 11, or over a communication line if the receiver has a communication line. This also applies to the correlation table for services and IP addresses for transmitting low quality data. A separate Internet path could also be used.

(Modification 1)

A first modification enabling seamlessly switching from low quality data playback to high quality data playback (or the opposite) is described next.

As shown in FIG. 1, IP packets 7b are generated less frequently than IP packets 7. Because the high quality encoder and low quality encoder are real-time encoders, the timing at which the IP packets 7 and IP packets 7b are generated is substantially the same as the timing at which the actual video is output. If the internal clock CLa of the high quality encoder or the internal clock CLb of the low quality encoder is faster than the other by occurs between the time stamp Ta and time stamp Tb for the same video. The video will therefore not be continuous when switching from high quality data playback to low quality data playback, or the reverse. This first modification corrects this non-continuous video to continuous video, that is, to a seamless video stream.

Figure 5:
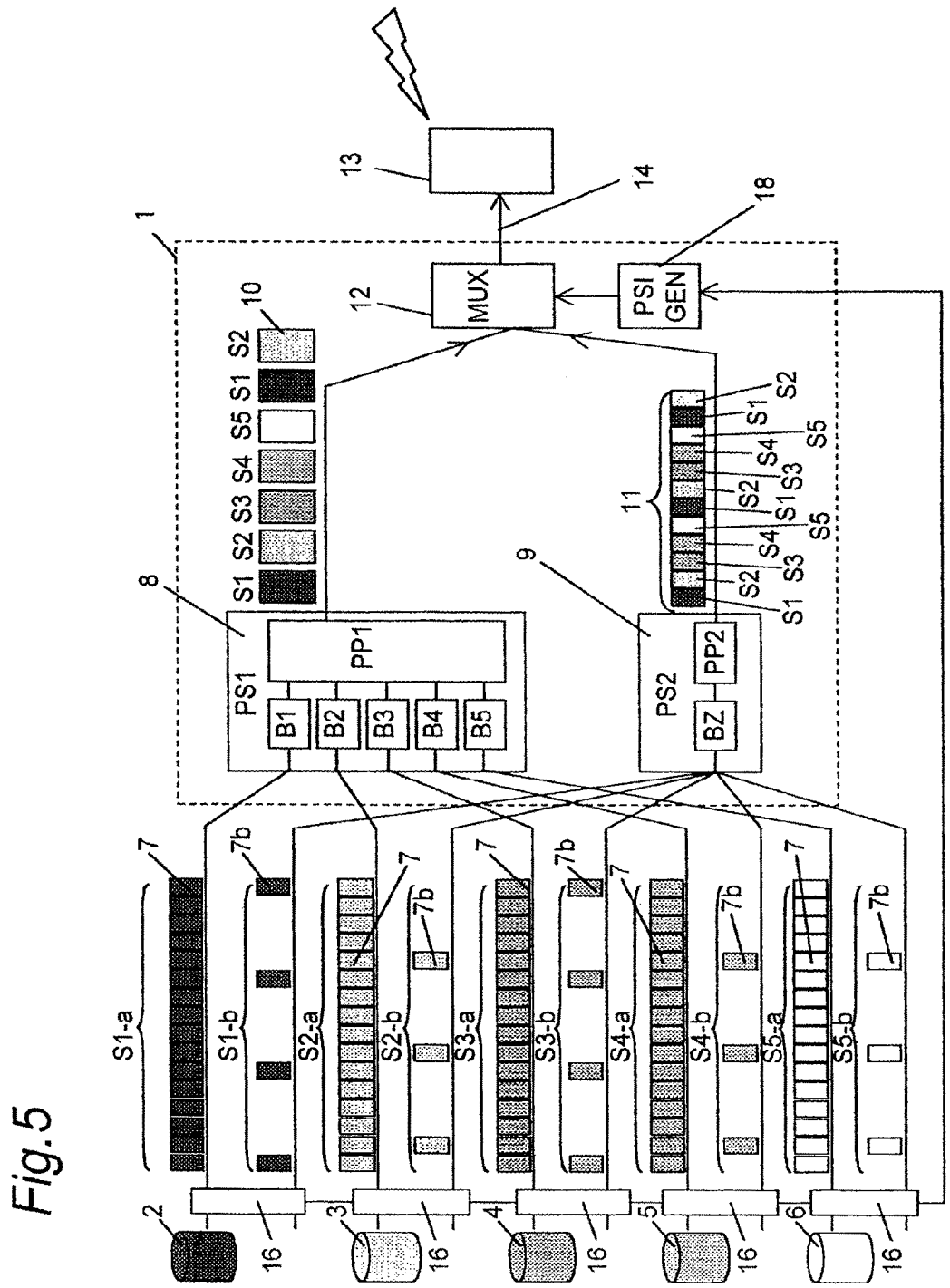
FIG. 5 describes the transmission method in a first modification of the first embodiment of the present invention.

The arrangement shown in FIG. 5 differs from that shown in FIG. 1 in that a time stamp offset detector 16 is additionally disposed. This time stamp offset detector 16 detects the time difference to the high quality data RTP header to denote the video presentation time of a particular frame and the time stamp Tb added to the low quality data RTP header to denote the presentation time of the corresponding frame as the time stamp offset. This time difference generator 18. The value of the program number set for each service is paired with the time difference This time difference receiver then adds Tb of the low quality data to synchronize the video of the high quality data and low quality data. Alternatively, could be added to or subtracted from the time stamp Ta of the high quality data to synchronize the video of the high quality data and low quality data.

This synchronization method is further described with reference to FIG. 4. If the user selects service S4 at time t4, the receiver extracts the low quality low quality data for service S4 from the zapping stream, starts playback, and waits to receive the high quality burst data for service S4. When a service S4 burst is transmitted at time t5, the service S4 burst is immediately received. The time stamp Ta of the high quality data is then corrected using time difference T to match the time stamp Tb of the low quality data. Playback of the high quality data thus begins at the corrected timing. Note that this correction is applied to the data to be played back.

When burst reception ends, the burst reception mode is activated and power supply to the reception unit stops from time t6 to time t7 when the next S4 burst is transmitted.

This method enables synchronizing the time stamps for two streams, and enables a smooth transition from playback of low quality data in the zapping mode to playback of high quality data in the intermittent reception mode.

The time stamp written in the RTP header of the IP packet is used as the time stamp in this modification, but MPEG packets could be used instead. In this situation the PCR time stamp in the MPEG packet is used.

(Modification 2)

A second modification enabling seamless switching from low quality data playback to high quality data playback (or the reverse) is described next below.

Figure 6:
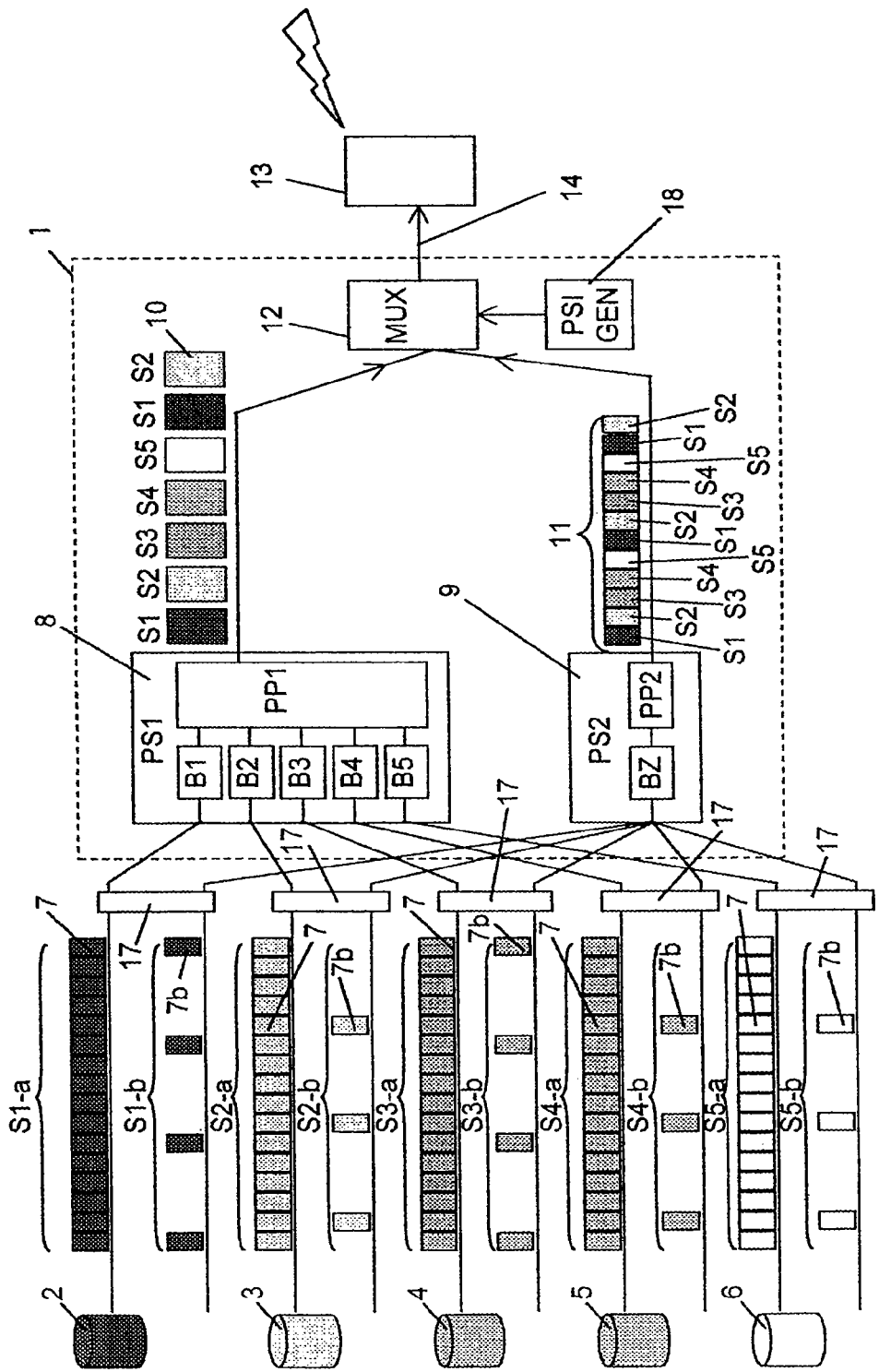
FIG. 6 describes the transmission method in a second modification of the first embodiment of the present invention.

The arrangement shown in FIG. 6 differs from the arrangement in FIG. 1 in that a time stamp correction processor 17 is additionally disposed. The time stamp correction processor 17 detects the time difference time stamp Ta of a certain frame of high quality data and the time stamp Tb of the corresponding frame in the low quality data as a time stamp offset. Using time difference time stamp correction processor 17 then corrects all time stamps in one stream so that the reference clock is the same in both streams. The same time stamp is thus added to the same frames in IP packets 7 and IP packets 7b. Seamless switching between image streams is thus possible.

(Modification 3)

A third modification of transmitting zapping data in this first embodiment of the invention is described next with reference to FIG. 7. This third modification transmits still image and audio data as the zapping data.

Figure 7:
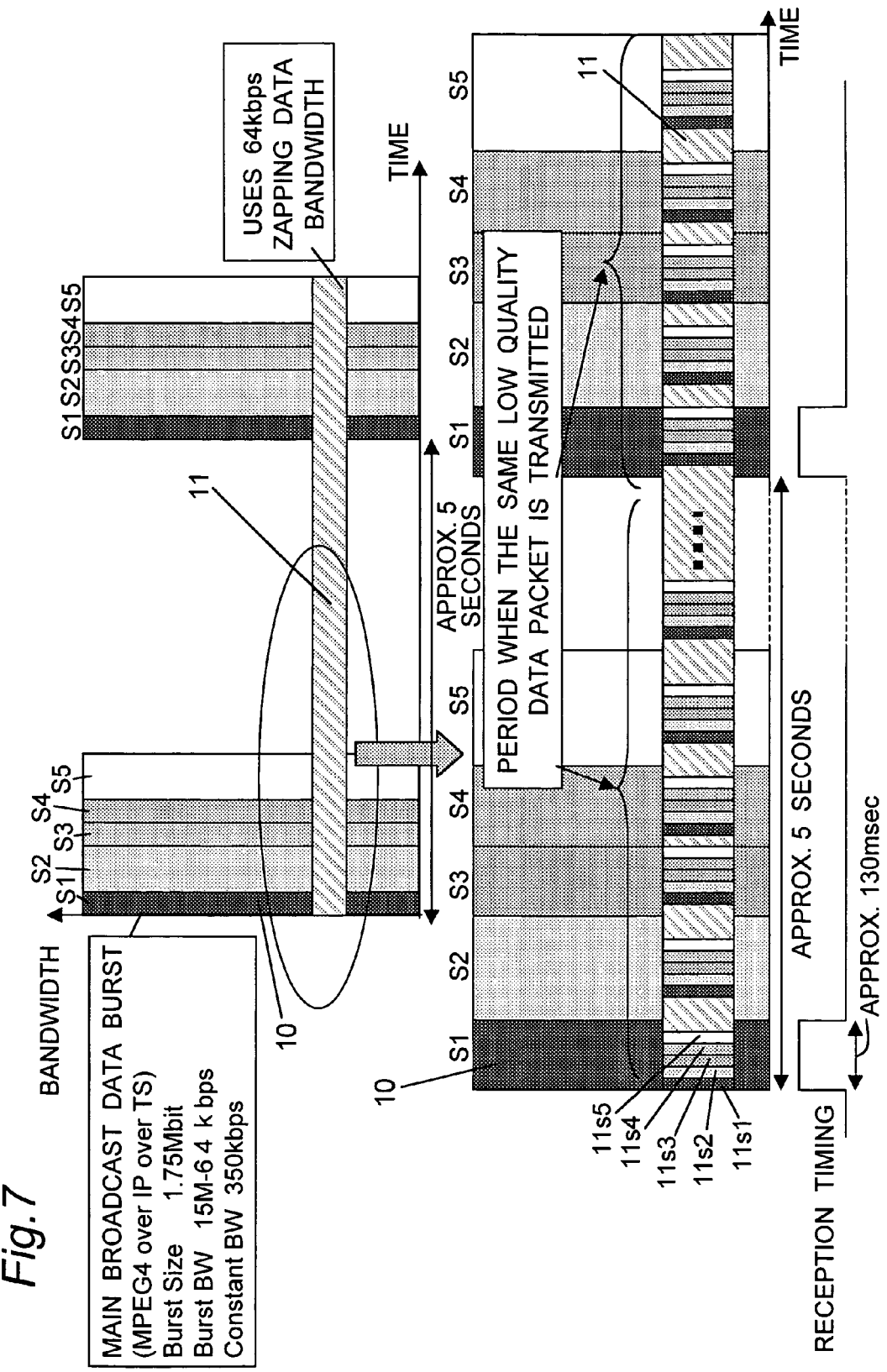
FIG. 7 describes the transmission method in a third modification of the first embodiment of the present invention.

FIG. 7 shows the data allocation on the transmission channel 14. Reference numeral 10 in FIG. 7 denotes a time slice carrying high quality data for services 1 to 5 with the video and audio data compressed using MPEG-4 to a 350-kbps average transfer rate. Reference numerals 11s1, 11s2, 11s3, 11s4, 11s5 denote low quality data for zapping. Packages are transmitted containing approximately 2 kbyte of still image data representing the video transmitted in each time slice of each service, and approximately 5 seconds of audio data containing the audio transmitted in one time slice of high quality data compressed to approximately 8 kbps. Note that the still image could be the program title or other text information.

Because the number of services transmitted in a time slice is small when transmitted mixed with DVB-T standard signals as in this example, low quality data packages for all services 11s1 to 11s5 can be transmitted in one continuous time slice period (approximately 130 msec) in zapping stream 11 at a 64 kbps average transfer rate.

The receiver can receive low quality data packages for zapping for all other services simultaneously to time slice reception, and can therefore present still images and audio without continuously supplying power to the demodulation unit and without waiting.

(Embodiment 2)

Another embodiment of the transmission method of the present invention is described with reference to FIG. 8.

Figure 8:
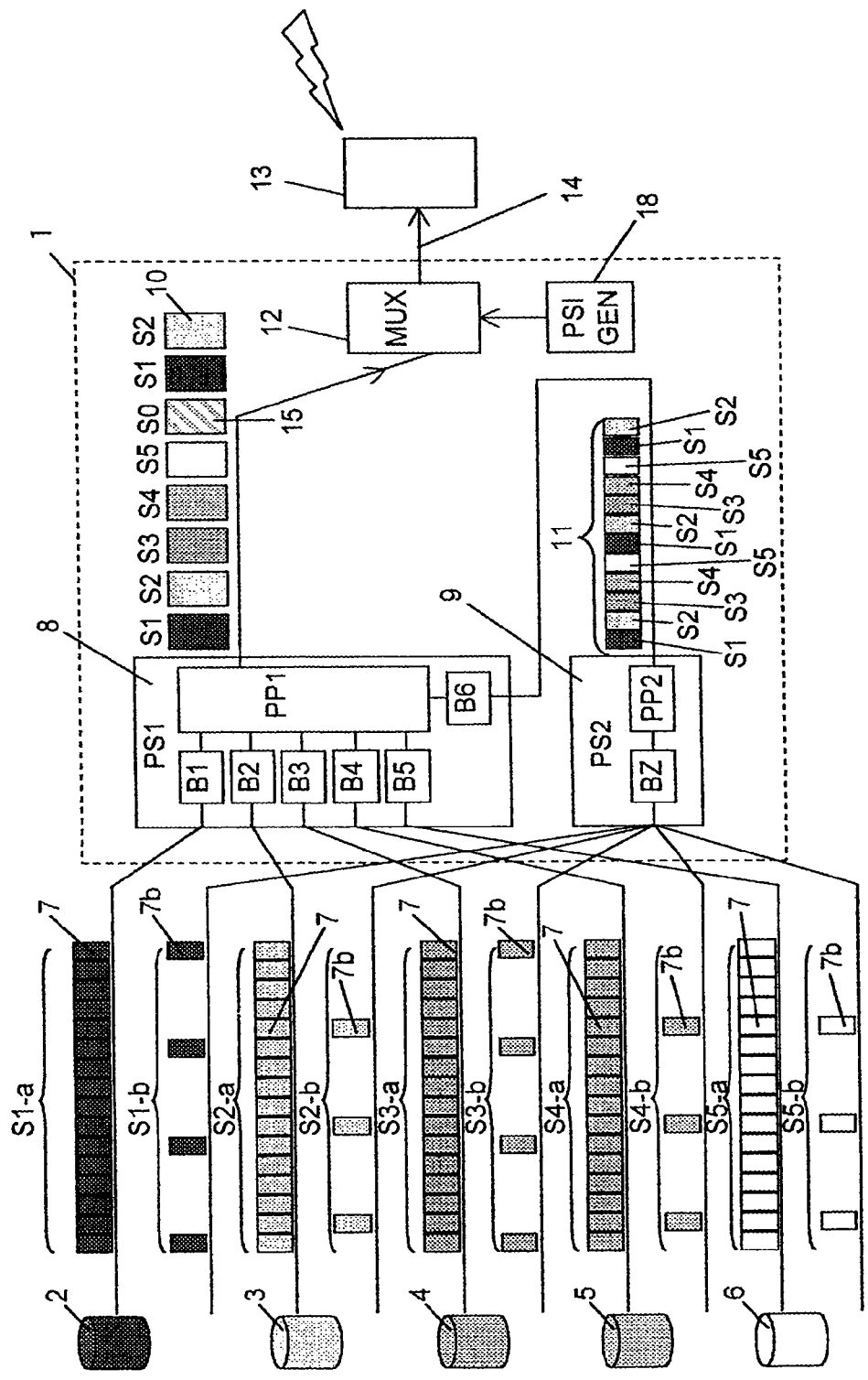
FIG. 8 describes the transmission method in a second embodiment of the present invention.

FIG. 8 describes transmission signal generation in the present invention. FIG. 8 differs from FIG. 1 in that the output of the processor 9 is input to the processor 8 instead of multiplexer 12, and a buffer B6 is added to the processor 8.

An approximately 5 minute portion of the low quality TS packet stream 11 output from the processor 9 is stored to buffer 6, and output from the processor 8 as a single burst 15. It goes without saying that burst 15 contains zapping TS packet group S0, which is equivalent to the 11 TS packet stream 11 to which the same PID address is added.

Time information denoting the timing at which the corresponding high quality burst is transmitted is added to the section containing the zapping burst 15. The multiple bursts 10 and zapping burst 15 are transmitted sequentially in bursts to the multiplexer 12, and are multiplexed by the multiplexer 12 with the four tables PAT, PMT, CAT, NIT produced by the PSI generator 18.

The transmission channel thus carries high quality data composing bursts for each service, and a single burst of low quality zapping data.

The reception method used by the receiver when a signal thus constructed is transmitted is described next with reference to the figures.

Figure 9:
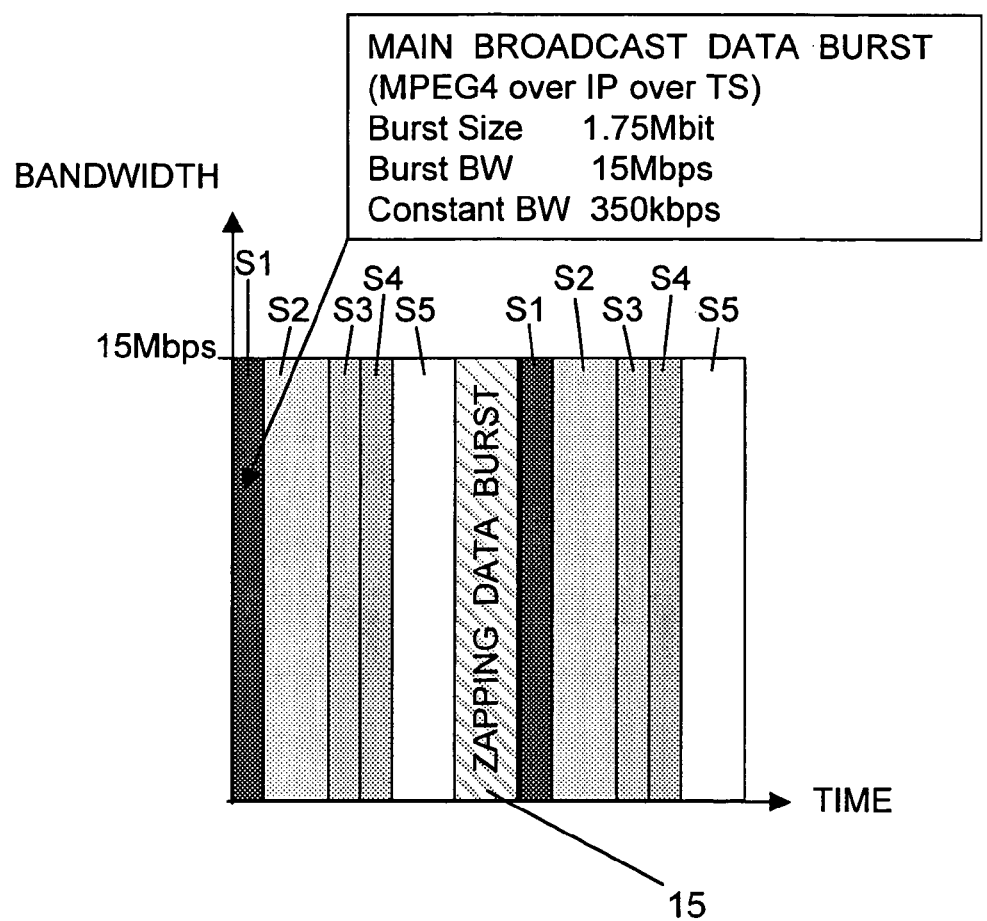
FIG. 9 illustrates data allocation on the transmission channel 14 in a second embodiment of the present invention.

FIG. 9 illustrates the data allocation on the transmission channel 14. FIG. 2 shows the data allocation on the transmission channel 14. In practice SI or PSI is also transmitted but these not shown in the figure because the SI and PSI are the same as those used in standard digital broadcasting.

Figure 10:
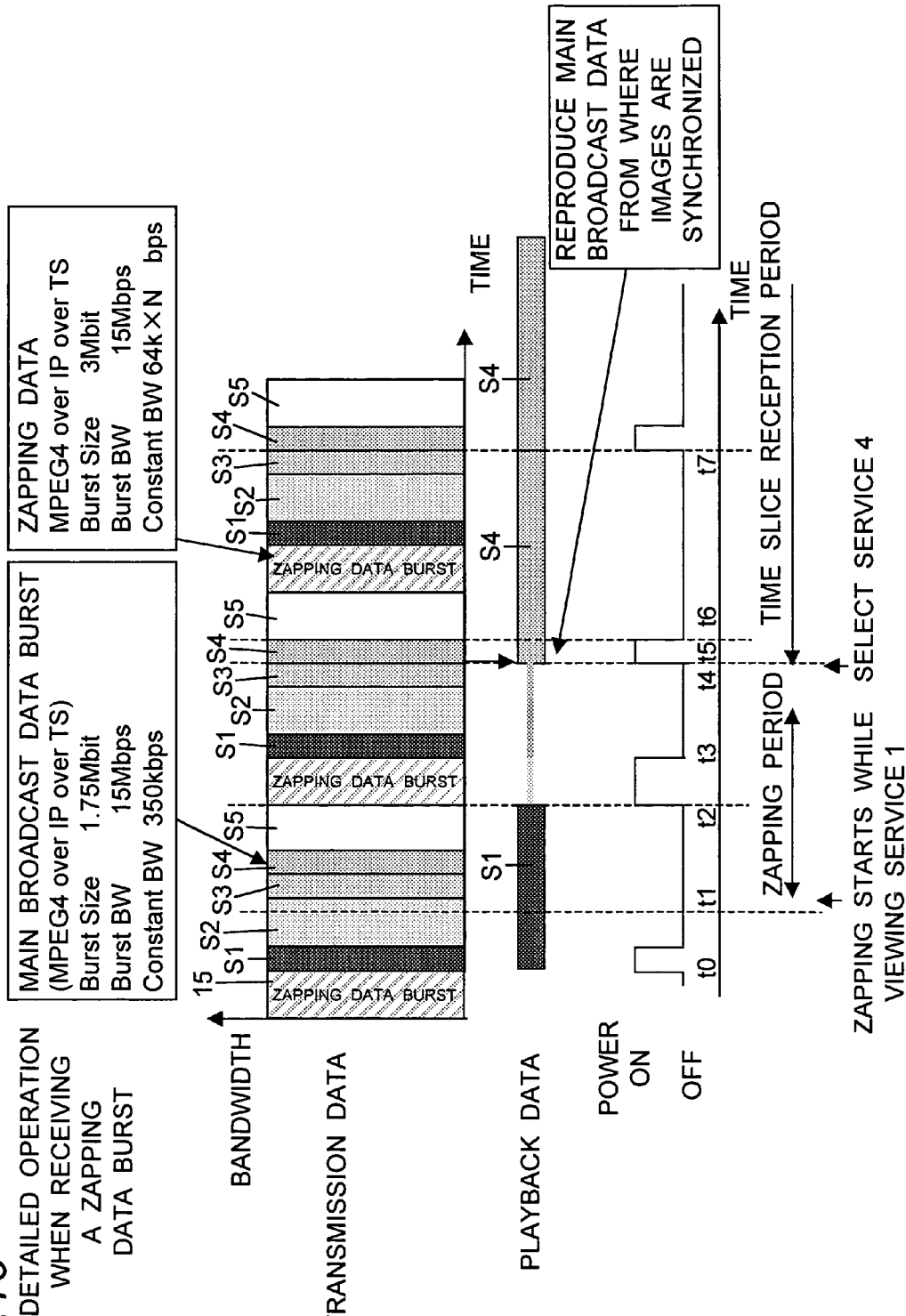
FIG. 10 describes a reception method for zapping reception of a stream in a second embodiment of the present invention.
Figure 11:
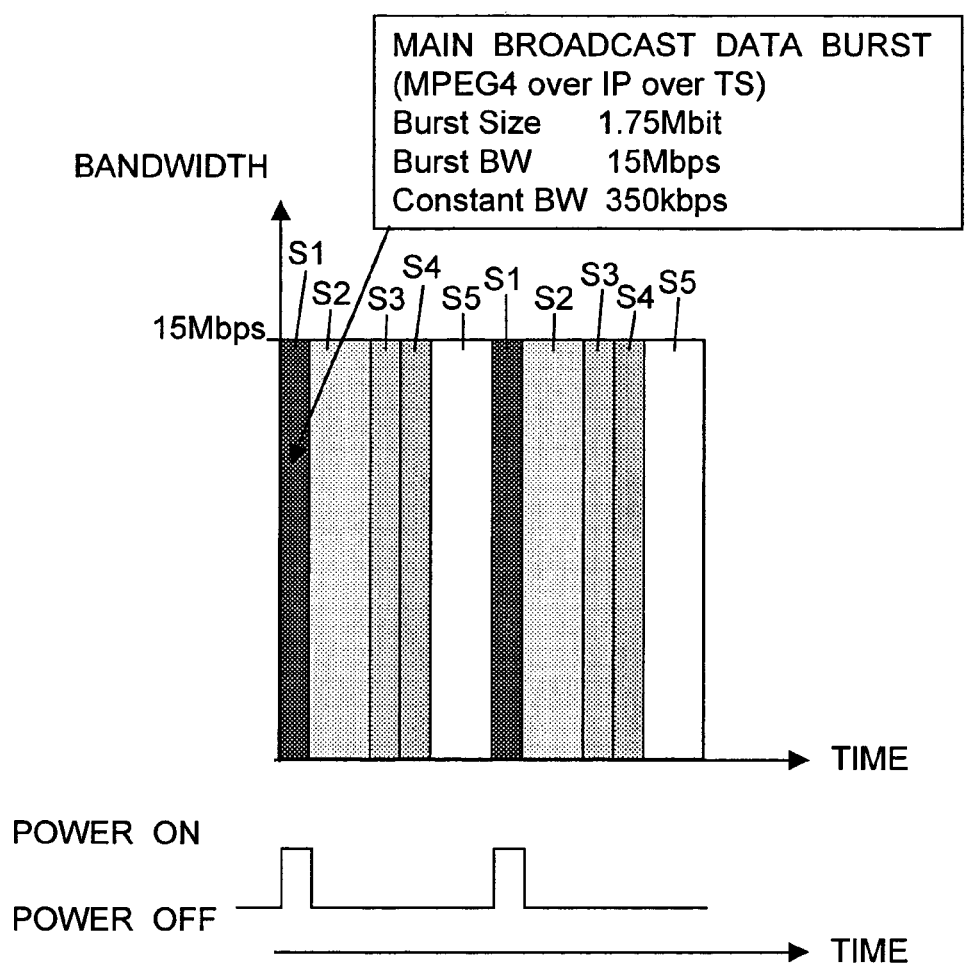
FIG. 11 describes an example of the art prior to the present invention.

FIG. 10 describes the reception method when receiving zapping data in this embodiment of the invention.

In this example service S1 is received in the intermittent reception mode at time t0, and when the service is changed to S2 at time t1 as a result of the user operating a service selection button or other user interface device, the reception unit power turns on and the zapping mode is activated.

Because the zapping burst 15 has not been transmitted at this time, S1 is reproduced until the zapping burst 15 can be received at time t2. After receiving the zapping burst 15, the receiver extracts the low quality data for service S2 from the zapping burst 15 and starts playback while service S2 is selected using the service-PID correlation table and the service-IP address correlation table acquired from the SI or PSI. The receiver simultaneously waits to receive the high quality data burst for service S2.

If the user then tunes into service S3 at time t3, the receiver extracts the low quality data for service S3 from the zapping stream and starts playback. The receiver simultaneously waits to receive the high quality data burst for service S3.

Operation remains in the zapping mode because the start of the burst for the currently tuned service has still not detected in the burst data.

If the user then selects service S4 at time t4, the receiver extracts the low quality data for service S4 from the zapping burst 15, starts playback, and waits to receive the high quality data burst for service S4. When the receiver then detects at time t5 that the service S4 burst is being transmitted, service S4 burst reception starts immediately, high quality data playback begins, and control switches to the burst reception mode. Power supply to the reception unit stops from time t6 to time t7 when the next service S4 burst is transmitted.

It will also be obvious that the same effect can be achieved in this example if the low quality data is the high quality data compressed at a high compression ratio, a still image and audio data related to the content, or only audio data.

The service-PID correlation table for the services and PIDs carrying high quality data is carried in the SI or PSI in this embodiment of the invention, but the method of transmitting the correlation table shall not be so limited. More particularly, the correlation table can be transmitted in the burst 10 or transport stream 11, or over a communication line such as an Internet connection if the receiver has a communication line. This also applies to the correlation table for services and IP addresses for transmitting low quality data.

This transmission method affords greater power conservation than the method of the first embodiment because intermittent reception is used even during the zapping period.

However, while there is a pause immediately after zapping starts before zapping data burst reception begins, the channel can be repeatedly zapped with immediate effect.

(Embodiment 3) Transmitting zapping data in bursts (Transmitting Still Images and Audio)

This third embodiment of the invention improves upon zapping data transmission in the first embodiment, and is described with reference to FIG. 12 and FIG. 13.

Figure 12:
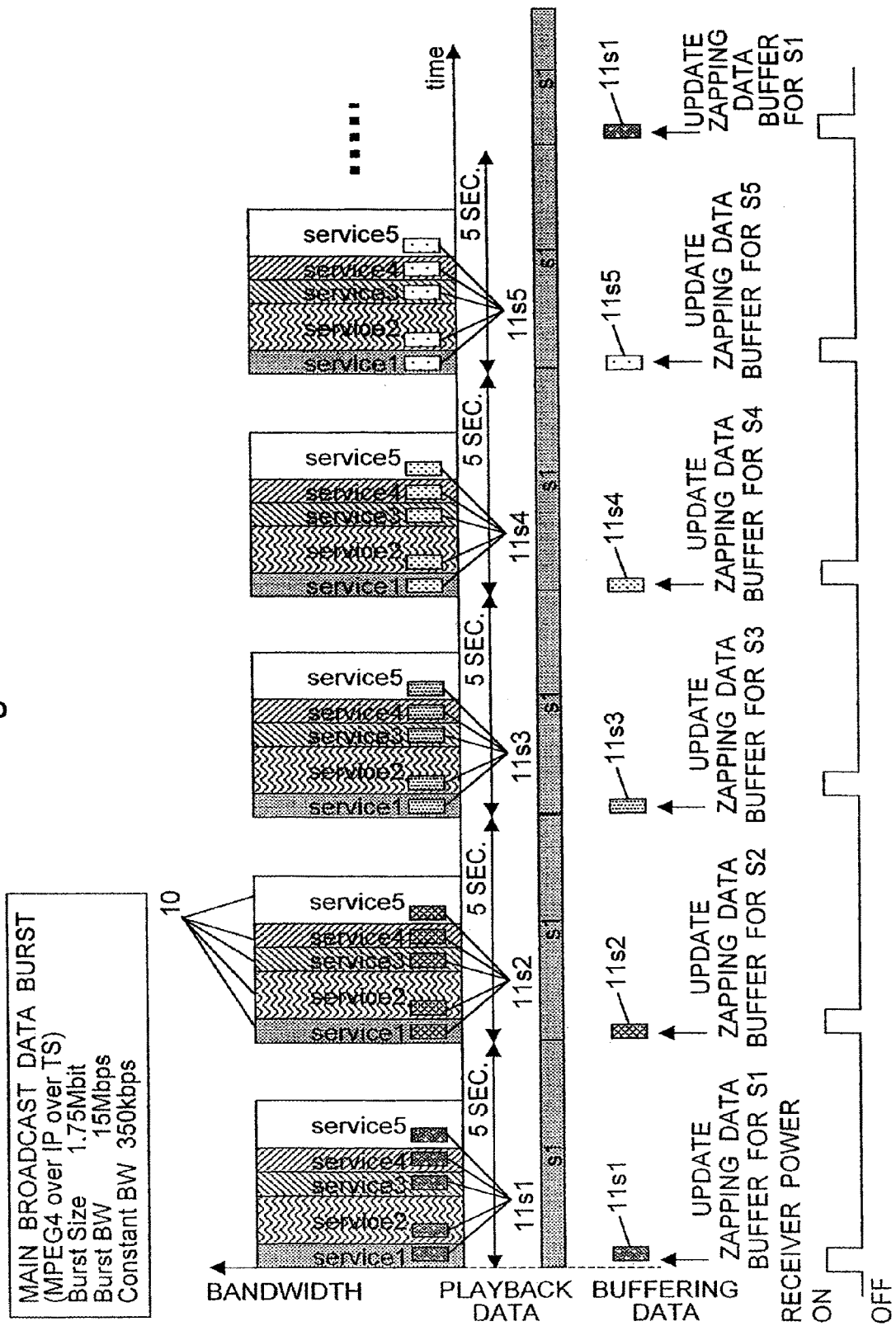
FIG. 12 describes the transmission method in a third embodiment of the present invention.

FIG. 12 shows the data allocation on the transmission channel 14 in this embodiment of the invention.

FIG. 7 shows the data allocation on the transmission channel 14. Reference numeral 10 in FIG. 7 denotes a time slice carrying high quality data for services 1 to 5 with the video and audio data compressed using MPEG-4 to a 350-kbps average transfer rate. Reference numerals 11s1, 11s2, 11s3, 11s4, 11s5 denote low quality data for zapping. Packages are transmitted containing approximately 10 kbyte of still image data representing the video transmitted in each time slice of each service, and approximately 25 seconds of audio data containing the audio transmitted in one time slice of high quality data compressed to approximately 8 kbps.

Only one zapping data block is multiplexed in each service time slice.

Referring to FIG. 12, when service S1 is selected and being received, zapping data for service S1 can be received in the first 5 second period, zapping data for service S2 can be received in the next 5 second period, zapping data for service S3 can be received in the next 5 second period, zapping data for service S4 can be received in the next 5 second period, and zapping data for service S5 can be received in the next 5 second period. If the same time slice is thus received for 25 consecutive seconds or more, zapping data for all services can be received in a 25 second period.

Figure 13:
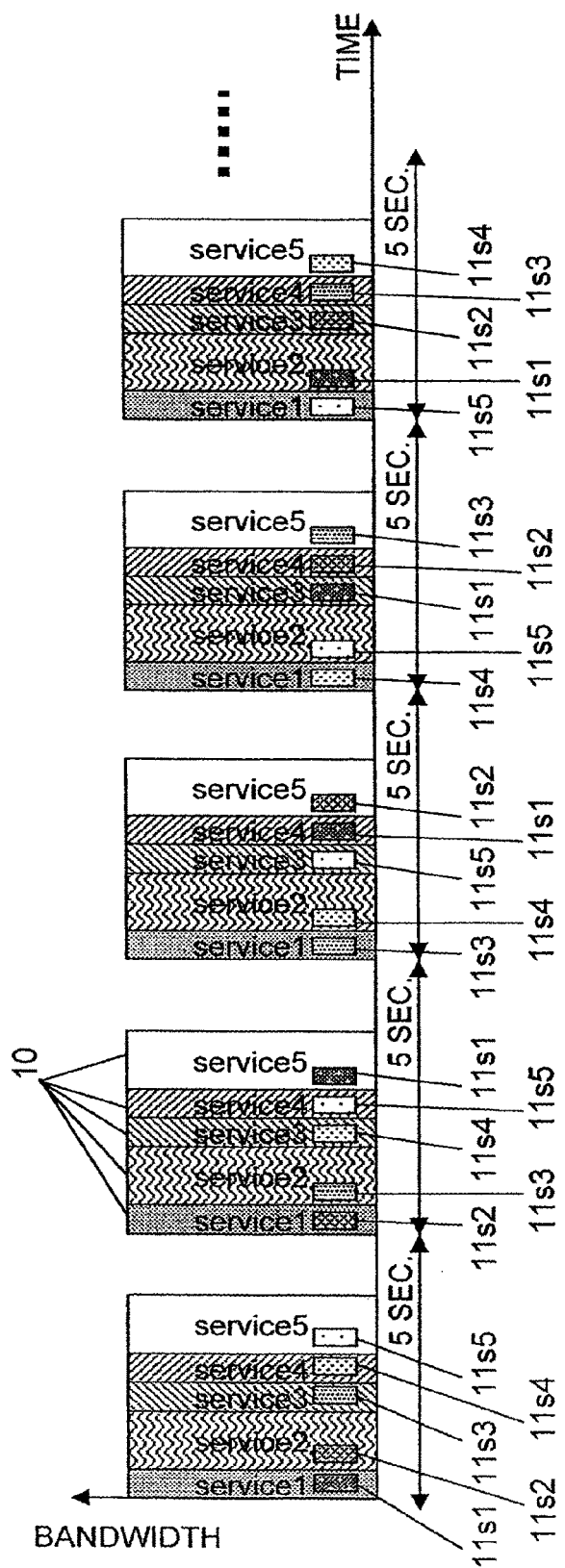
FIG. 13 illustrates another arrangement of the zapping data in the third embodiment of the present invention.

FIG. 13 shows an alternative method of allocating the zapping data. In this method the zapping data in one service time slice shifts once every 5 seconds. The method shown in FIG. 13 thus also enables receiving zapping data for all services in a 25 second period if the same time slice is received for 25 consecutive seconds or more.

Each time a time slice is received, the receiver updates the data in the internal zapping data storage area (zapping buffer). The data in the zapping buffer can thus be reproduced when the user starts zapping, and still images and audio can be presented without waiting and without continuously supplying power to the demodulation unit.

So that the receiving side can process the received data without distinguishing high quality data and low quality data, the IP address of the IP packets is preferably different for each service. IP packets such as S1-a, S1-b having the same content preferably have the same IP address. Different IP addresses could, however, be assigned to the IP packets carrying the high quality data and low quality data versions of the same content.

Furthermore, when a plurality of zapping streams (such as a zapping stream for text and a zapping stream for still images) is transmitted, multiple records of zapping stream data could be written in the PMT.

(Transmitting Zapping Data for Multiple Channels)

The foregoing embodiments have been described using a zapping stream for multiple services carried on one channel, but the same effect can be achieved when multiple channels are transmitted and a zapping stream is carried on each channel.

Furthermore, if zapping data for the service transmitted on a first channel is transmitted multiplexed to the zapping stream of the second channel when services are received using multiple transmission channels, the zapping data contained in the first channel can be viewed when receiving the second channel by using the zapping stream in the second channel.

APPLICATION IN INDUSTRY

The present invention can be used in a transmission method for broadcasting digital data.

The invention claimed is:

1. A transmission method for transmitting a plurality of streams in a multiplexed format, comprising:
generating, using a multiplexer device, a transmission stream through multiplexing of a first stream having data of a first service, a second stream having data of a second service, and a third stream having data related to the first service and data related to the second service;
transmitting, using a transmitter, said transmission stream;
wherein said transmission stream has such a structure that first bursts for transmitting the first stream and second bursts for transmitting the second stream are located periodically in said transmission stream after a predetermined cyclic period,
wherein each of at least one batch, that is shorter than said predetermined cyclic period, occurs once in said predetermined cyclic period and concludes with a pause in transmission, includes one of said first bursts and one of said second bursts,
wherein first and second bursts are transmitted without a pause therebetween to present a batch with continuous data alignment,
wherein said third stream is carried in said first bursts and also in said second bursts, and
wherein said first bursts carry all data of the data related to the first service and the data related to the second service as carried in said third stream, and also said second bursts carry all data of the data related to the first service and the data related to the second service as carried in said third stream.

2. A transmission method as described in claim 1,
wherein said data for the first service is a high quality content data provided by said first service,
wherein said data for the second service is a high quality content data provided by said second service,
wherein said data related to the first service is a low quality content data provided by said first service, and
wherein said data related to the second service is a low quality content data provided by said second service.

3. A transmission method as described in claim 2,
wherein said high quality content data is data containing video data and audio data of the content.

4. A transmission method as described in claim 2,
wherein said low quality content data is data containing still image data and/or audio data related to the content.

5. A transmission method as described in claim 2,
wherein said low quality content data is data containing text data related to the content.

6. A transmission apparatus for transmitting a plurality of streams in a multiplexed format, comprising:
a multiplexer operable to generate a transmission stream through multiplexing of a first stream having data of a first service, a second stream having data of a second service, and a third stream having data related to the first service and data related to the second service; and
a transmitter operable to transmit said transmission stream;
wherein said transmission stream has such a structure that first bursts for transmitting the first stream and second bursts for transmitting the second stream are located periodically in said transmission stream after a predetermined cyclic period,
wherein each of at least one batch, that is shorter than said predetermined cyclic period, occurs once in said predetermined cyclic period and concludes with a pause in transmission, includes one of said first bursts and one of said second bursts,
wherein first and second bursts are transmitted without a pause therebetween to present a batch with continuous data alignment,
wherein said third stream is carried in said first bursts and also in said second bursts, and
wherein said first bursts carry all data of the data related to the first service and the data related to the second service as carried in said third stream, and also said second bursts carry all data of the data related to the first service and the data related to the second service as carried in said third stream.

7. A receiving method for receiving a transmission stream having a plurality of streams in a multiplexed format, said transmission stream being formed, using a multiplexer device, through multiplexing of a first stream having data of a first service, a second stream having data of a second service, and a third stream having data related to the first service and data related to the second service, said transmission stream having such a structure that first bursts for transmitting the first stream and second bursts for transmitting the second stream are located periodically in said transmission stream after a predetermined cyclic period, each of at least one batch, that is shorter than said predetermined cyclic period, occurs once in said predetermined cyclic period and concludes with a pause in transmission, including one of said first bursts and one of said second bursts, and said third stream being carried in said first bursts and also in said second burst, said receiving method comprising:
receiving said transmission stream, formed using the multiplexer device and transmitted using a transmitter, partially and selectively during a period at which the first bursts or the second bursts, being selected by a service recipient, are transmitted;
extracting said third stream from the first bursts or the second bursts being received, and storing the extracted third stream; and
presenting said third stream when the service recipient alters the receiving service from the first service presented by the first bursts to the second service presented by the second bursts, or vice versa, wherein said first bursts carry all data of the data related to the first service and the data related to the second service as carried in said third stream, and also said second bursts carry all data of the data related to the first service and the data related to the second service as carried in said third stream, wherein first and second bursts are transmitted without a pause therebetween to present a batch with continuous data alignment.

8. A receiving apparatus for receiving a transmission stream having a plurality of streams in a multiplexed format, said transmission stream being formed through multiplexing of a first stream having data of a first service, a second stream having data of a second service, and a third stream having data related to the first service and data related to the second service, said transmission stream having such a structure that first bursts for transmitting the first stream and second bursts for transmitting the second stream are located periodically in said transmission stream after a predetermined cyclic period, each of at least one batch, that is shorter than said predetermined cyclic period, occurs once in said predetermined cyclic period and concludes with a pause in transmission, including one of said first bursts and one of said second bursts, and said third stream being carried in said first bursts and also in said second bursts, said receiving method comprising:

a receiver operable to receive said transmission stream partially and selectively during a period at which the first bursts or the second bursts, being selected by a service recipient, are transmitted;

an extractor operable to extract said third stream from the first bursts or the second bursts being received, and storing the extracted third stream; and a presenting device operable to present said third stream when the service recipient alters the receiving service from the first service presented by the first bursts to the second service presented by the second bursts, or vice versa, wherein said first bursts carry all data of the data related to the first service and the data related to the second service as carried in said third stream, and also said second bursts carry all data of the data related to the first service and the data related to the second service as carried in said third stream, wherein first and second bursts are transmitted without a pause therebetween to present a batch with continuous data alignment.

* * * * *